(No Model.)
F. E. WRIGHT.
TRIPOD JOINT.
No. 357,299. Patented Feb. 8, 1887.
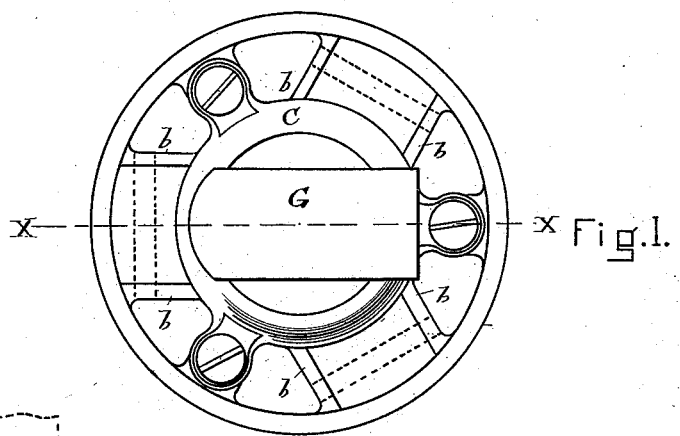
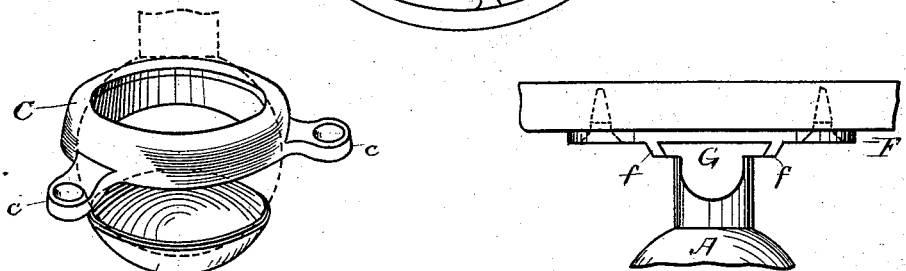
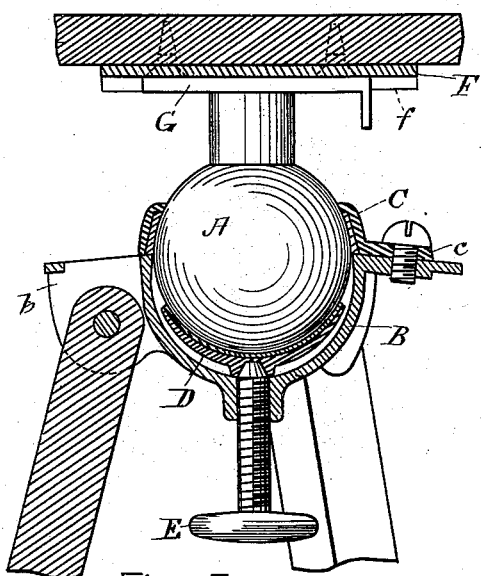
WITNESSES
J. Henry Taylor
James F. Bligh
INVENTOR
Frederick E. Wright
by Alex Brown
attorney

UNITED STATES PATENT OFFICE.

FREDERICK E. WRIGHT, OF BOSTON, MASSACHUSETTS.

TRIPOD-JOINT.

SPECIFICATION forming part of Letters Patent No. 357,299, dated February 8, 1887.

Application filed June 12, 1886. Serial No. 204,958. (No model.)

*To all whom it may concern:*

Be it known that I, FREDERICK E. WRIGHT, of Boston, in the county of Suffolk and State of Massachusetts, a citizen of the United States, have invented certain new and useful Improvements in Camera Tripod-Joints, of which the following is a specification.

My invention relates to improvements in tripod-joints for photographic cameras; and it has for its object to provide means whereby the camera may be readily adjusted in any desired plane relatively to that of the tripod or its base.

My improved camera tripod-joint belongs to that class of such appliances in which a camera is connected with and adjusted upon its supporting-tripod by means of a ball and socket or so-called "universal" joint. Such a device is shown in Letters Patent No. 318,480, granted May 26, 1885, and my present invention may be regarded as an improvement upon the device shown in that patent.

In the accompanying drawings I have represented at Figure 1 a top plan view of a device embodying my present improvement in the form now best known to me; at Fig. 2, a vertical section on the line X X of Fig. 1; at Fig. 3, views in perspective of the retaining-ring and compression-cup, hereinafter described; and at Fig. 4, a detail view of a device for attaching the camera to the ball.

In the drawings, A represents the ball, and B a socket-plate containing the lower portion or cup of the socket, with which may be combined, as shown, the ears or lugs b, by which the device is connected with the legs of the tripod.

C represents the retaining-ring which forms the other part of the socket in which the ball is inclosed. This ring is not, as in the Letters Patent above referred to, adjustably secured to the socket-plate B, but is intended to be (removably) attached thereto in such a manner that when the device is in use the ring C will be firmly held or secured to the socket-plate B with the ball between them. For this attachment I have represented in the drawings the ring C as provided with perforated lugs c, through which pass attaching-screws entering threaded perforations in the plate B. Any other suitable means of attachment may, however, be adopted, it being borne in mind that this attachment is not a part of the clamping mechanism.

My improved clamping device consists of a compression-cup, D, suitably formed to lie in the bottom of the socket-cup and to bear against the lower portion of the ball. To operate this compression-cup and force it against the ball to clamp the latter in the desired position, I provide a screw, E, which works in a threaded perforation in the bottom of the socket B. This screw bears against the compression-cup D, and by turning the screw the cup is tightened or loosened upon the ball to clamp it, and thus hold the camera firmly in the desired position. In order to allow play I prefer to make the connection between the screw and compression-cup, as shown, in the form of a hollow or depression in the bottom of the cup, in which the unthreaded end of the screw may bear; but the screw may be attached to the base of the compression-cup, so that the two will turn together instead of one turning upon the other.

The interior faces of the retaining-ring C and the compression-cup D may, if desired, be lined with leather or other suitable material to give a good bearing and prevent wear, and I have so represented them in the drawings.

For the attachment of the ball to the camera any suitable device may be employed. I have represented herein, at Fig. 5, a well-known convenient attachment, consisting of a plate, F, provided with perforated lugs, to be screwed onto the under side of the camera. On the exposed face of this plate are formed a pair of flanges, *f*, slightly converging in the direction of their length. To engage with these flanges, a wedge-plate, G, may be formed upon the ball A, the edges of which plate match the flanges in the plate F. The plates F and G, when so constructed, may be united by sliding the latter beneath the flanges of the former until the two are wedged and so held firmly.

I claim—

1. In a camera tripod-joint of the ball-and-socket character, as herein described, the combination, with the ball, the socket-plate, and retaining-ring, of a compression-cup, as described, and a screw for operating the said cup to lock or unlock the joint, all substantially as herein set forth, and for the purposes herein specified.

2. In a camera tripod-joint, the combination of a socket-plate, B, compression-cup D, a retaining-ring, and an operating-screw, all substantially as set forth.

3. In a camera tripod-joint, the combination, with the ball A, of the socket-plate B, retaining-ring C, compression-cup D, and operating-screw E, threaded in the socket-plate, all substantially as described.

In testimony whereof I have hereunto subscribed my name this 9th day of June, A. D. 1886.

FREDERICK E. WRIGHT.

Witnesses:
J. HENRY TAYLOR,
JAMES F. BLIGH.